(12) United States Patent
Kim et al.

(10) Patent No.: US 6,781,654 B2
(45) Date of Patent: Aug. 24, 2004

(54) LIQUID CRYSTAL DISPLAY APPARATUS AND MOBILE TERMINAL USING SAME

(75) Inventors: Young Ho Kim, Seoul (KR); Seong Woo Choi, Busan (KR); Sang Yong Lee, Seoul (KR); Young Sik Ha, Seoul (KR); Soo Ho An, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 10/039,252

(22) Filed: Jan. 3, 2002

(65) Prior Publication Data

US 2002/0130998 A1 Sep. 19, 2002

(30) Foreign Application Priority Data

Jan. 13, 2001 (KR) .......................................... 2001/2044

(51) Int. Cl.[7] ..................... G02F 1/1333; G02F 1/1335; F21V 7/04
(52) U.S. Cl. ........................... 349/122; 349/62; 349/63; 362/31
(58) Field of Search ................................ 349/122, 150, 349/62, 63, 64, 65; 362/31

(56) References Cited

U.S. PATENT DOCUMENTS

| | | | |
|---|---|---|---|
| 6,088,069 A | * | 7/2000 | Farlow ........................ 349/12 |
| 6,191,838 B1 | * | 2/2001 | Muramatsu .................. 349/149 |
| 6,282,825 B1 | * | 9/2001 | Godfrey et al. ................ 40/611 |
| 6,352,322 B1 | * | 3/2002 | Nakao ....................... 312/223.1 |
| 6,445,373 B1 | * | 9/2002 | Yamamoto .................. 345/102 |
| 2001/0012706 A1 | * | 8/2001 | Imaeda ......................... 439/66 |

FOREIGN PATENT DOCUMENTS

| | | | |
|---|---|---|---|
| JP | 03-156488 | 7/1991 | ............. G09F/9/00 |
| JP | 04-40223 | 4/1992 | ......... G02F/1/1335 |

* cited by examiner

*Primary Examiner*—Tarifur R. Chowdhury
(74) *Attorney, Agent, or Firm*—Lee, Hong, Degerman, Kang & Schmadeka

(57) ABSTRACT

A mobile terminal having a liquid crystal display apparatus, which includes a liquid crystal panel having a polygonal flat shape and an adhesion member installed on at least one part among edges except corner parts at the flat portion of the liquid crystal panel. The mobile terminal includes a transmission and reception unit positioned at one side of a case, an input adjusting unit exposed to external portion of the case, a control unit, and a liquid crystal display driving unit operated by an output signal of the control unit, Accordingly, the mobile terminal with the liquid crystal display apparatus features improved durability and reliability since the liquid crystal panel has minimized spot generation that may occur from physical impacts, temperature changes or applied wrenching loads.

20 Claims, 9 Drawing Sheets

LIQUID CRYSTAL DISPLAY APPARATUS AND MOBILE TERMINAL USING SAME

BACKGROUND OF THE INVENTION

1. Field of the Invention

The present invention relates to a liquid crystal display apparatus and a mobile terminal which display letter or image information and particularly, to a liquid crystal display apparatus and a mobile terminal having a liquid crystal panel which does not easily get out of order by an external impact.

2. Description of the Background Art

Generally, Liquid Crystal Display (LCD) is a displaying apparatus installed in a mobile terminal, monitor and the like and liquid crystal which is a material between liquid and solid condition is injected between two sheets of glass substrates formed as electrodes to display letters or images by adding an electric field.

As shown in FIG. 1, such liquid crystal display apparatus is installed in folder-type mobile terminal 1 and the like to display adjust or use condition or letter or image information, etc.

Particularly, since a liquid crystal panel composing the liquid crystal display apparatus can not emit light by itself, a back light sheet is installed at the rear side and accordingly letter or image information displayed on the liquid crystal panel can be recognized more clearly by penetrating light emitted from the back light sheet.

The back light sheet mainly employs a direct method for directly illuminating the front surface of the liquid crystal panel using Electro luminescence (EL) or an edge method for illuminating the liquid crystal panel using light diffused by a light transmission board having light sources at one or two sides of the liquid crystal panel. Between the methods, the liquid crystal display apparatus having a back light sheet by the direct method is mainly used for miniature electric devices such as mobile terminals and the like.

FIG. 2 is an exploded perspective view showing a conventional liquid crystal display apparatus by the direct method.

With reference to FIG. 2, the liquid crystal display apparatus 10 positioned in a mobile terminal is inserted-installed in a frame 17 fixed in a case of the terminal and as shown in FIG. 1, it displays letter or image information through a viewing window.

Since such liquid crystal display apparatus 10 has a liquid crystal panel 11, a Flexible Printed circuit (FPC) 12 is connected to the liquid crystal panel 11 and a reflection board 13 for reflecting light incident from the liquid crystal panel 11 is adhered to the rear surface as a single body.

The back light sheet 15 formed as a flat board shape, for illuminating the liquid crystal panel 11 is positioned on the rear surface of the liquid crystal panel 11 where the reflection board 13 is attached. Here, the reflection board 13 penetrates the light emitted from the back light sheet 15 in the direction of the liquid crystal panel 11.

Here, the reflection board 13 and back light sheet 15 forming the rear surface of the liquid crystal panel 11 are mutually attached by a double-faced adhesive tape 20.

Therefore, the liquid crystal panel 11, reflection board 13 and back light sheet 15 form a liquid crystal panel assembly and the liquid crystal panel assembly is inserted-assembled in the frame 17.

Particularly, the double-faced adhesive tape 20 is formed in a square band shape not to interfere the light illuminated from the back light sheet 15 and maintain an adhesive force between the liquid crystal panel 11 and back light sheet 15 and is adhered to the circumferential portions 13P and 15P between the reflection board 13 and back light sheet 15 adhered to the liquid crystal panel 11 as a single body.

As shown in FIG. 3, the double-faced adhesive tape 20 is adhered to the inner surface 17A of the frame 17 in FIG. 2 having some portions 20A and 20B which are formed protruded further than the periphery of the back light sheet 15.

On the other hand, as shown in FIG. 2, a polarizing plate 19 for forwardly penetrating the light penetrated through the liquid crystal panel 11 at the front side of the liquid crystal panel 11.

However, since in the conventional liquid crystal display apparatus, the double-faced adhesive tape 20 is adhered to the circumferential surface of the liquid crystal panel 11 and back light sheet 15, the liquid crystal panel 11 is easily transformed or broken by external impacts.

Namely, as shown in FIG. 3, since all parts of the liquid crystal panel 11 are adhered and bound to the back light sheet 15 by the double-faced adhesive tape 20, when instantaneous impact is applied as in the case that the liquid crystal display apparatus falls and is collided with a bottom, the lower substrate 11B of the liquid crystal panel 11 is adhered to the back light sheet 15 as a single body by the reflection board 13 and fixed to the frame 17 as shown in FIG. 4. However, the upper substrate 11A performs relative movement minutely contrary to the lower substrate 11B by the falling impact and the upper substrate 11A and the lower substrate 11B are instantaneously cracked apart in the "A" and "B" directions.

When the upper substrate upper substrate 11A and the lower substrate 11B are instantaneously cracked apart, vacuum foams are formed from the liquid crystal 11C filled between the both substrates 11A and 11B to the space cracked apart and a bleeding phenomenon of an exploded dotted pattern regardless of the inputted display signal. In the excessive case, letter or image information can not be clearly displayed by the bleeding phenomenon.

Particularly, in case of using a mobile communication instrument such as a mobile terminal, the bleeding phenomenon is often occurred when the instrument falls. At this time, as shown in FIG. 5, by the impact, the corner parts are damaged by the bleeding phenomenon and letter or image information is not displayed clearly.

Here, FIG. 5A shows the initial stage of the bleeding phenomenon that spots are occurred on the liquid crystal panel 11 right after the mobile terminal 1 falls in case the liquid crystal display apparatus 10 is installed in the mobile terminal 1 and FIG. 5B shows the bleeding expansion phenomenon that the spot (BL) is gradually expanded after 24 hours after the falling.

SUMMARY OF THE INVENTION

Therefore, to solve the above problem, the present invention provides a liquid crystal display apparatus and a mobile terminal capable of improving durability of the liquid crystal panel minimizing spot generation even though impacts by a falling or temperature change or a certain wrenching load is applied, by installing double-faced adhesive tape only at the edge portions except corner parts of the liquid crystal panel and the back light sheet and composing the liquid crystal panel and the back light sheet to be mutually adhered.

To achieve these and other advantages and in accordance with the purpose of the present invention, as embodied and broadly described herein, there is provided a liquid crystal display apparatus including a liquid crystal panel having a polygonal flat shape, a back light sheet positioned on the rear surface of the liquid crystal panel, for illuminating the liquid crystal panel with light and an adhesion member for mutually adhering the liquid crystal panel and the back light sheet by forming adhesion force in at least one part among edges except corner parts between the liquid crystal panel and the back light sheet.

Also, a mobile terminal for achieving the above object includes a transmission and reception means positioned at one side of a case, an input adjusting means exposed to external portion of the case being adjusted by a user, a control means for outputting a driving signal according to an input signal of the input adjusting means at the same time when the signals are inputted and outputted, being connected to the transmission and reception means, a liquid crystal display driving means operated by the output signal of the control means, a liquid crystal panel positioned in the case so that it can be shown from the outside, for displaying letter or image information by the liquid crystal display driving means and an adhesion member installed at least one part among edges except corner parts at the flat portion of the liquid crystal panel for supporting the liquid crystal panel in the case.

The foregoing and other, features, aspects and advantages of the present invention will become more apparent from the following detailed description when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 6:
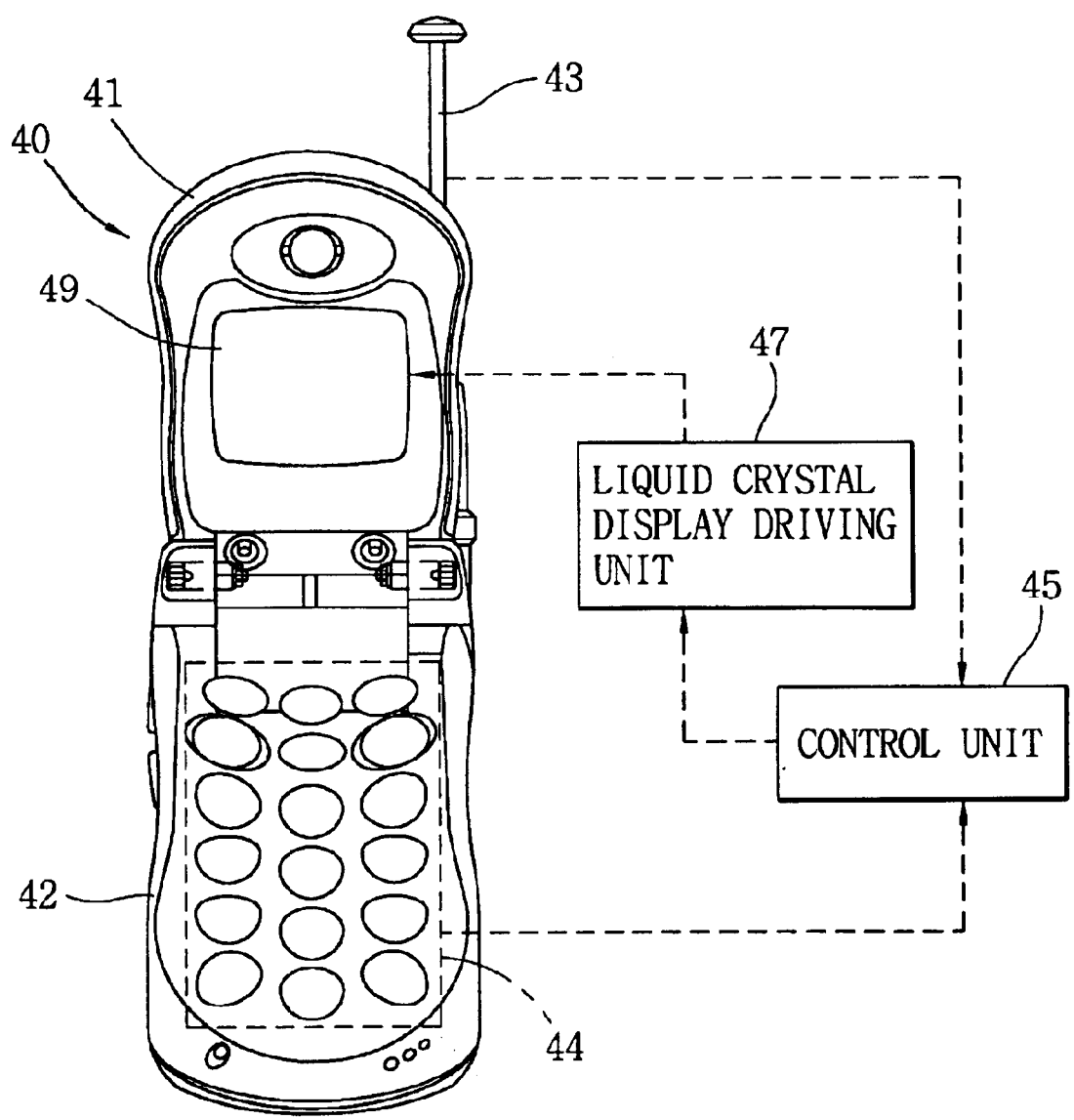
FIG. 6 is a block diagram showing a mobile terminal in accordance with the present invention.

FIG. 6 is a block diagram showing a folder-type mobile terminal in accordance with the present invention.

The mobile terminal in accordance with the present invention 40 includes a transmission and reception unit 43 positioned at the side of a folder 41, an input adjusting unit 44 exposed to the upper surface of the main body 42 being adjusted by a user, a control unit 45 connected with the transmission and reception unit 43, for outputting a controlling driving signal according to an input signal of the input adjusting unit 44 at the same time when the signals are inputted and outputted, being connected to the transmission and reception unit 43, a liquid crystal display driving unit 47 operated by the output signal of the control unit 45 and a liquid crystal display apparatus 49 positioned inside the folder 41 so that it can be shown from the outside, for displaying letter or image information by the operation of the liquid crystal display driving unit 47.

Figure 7:
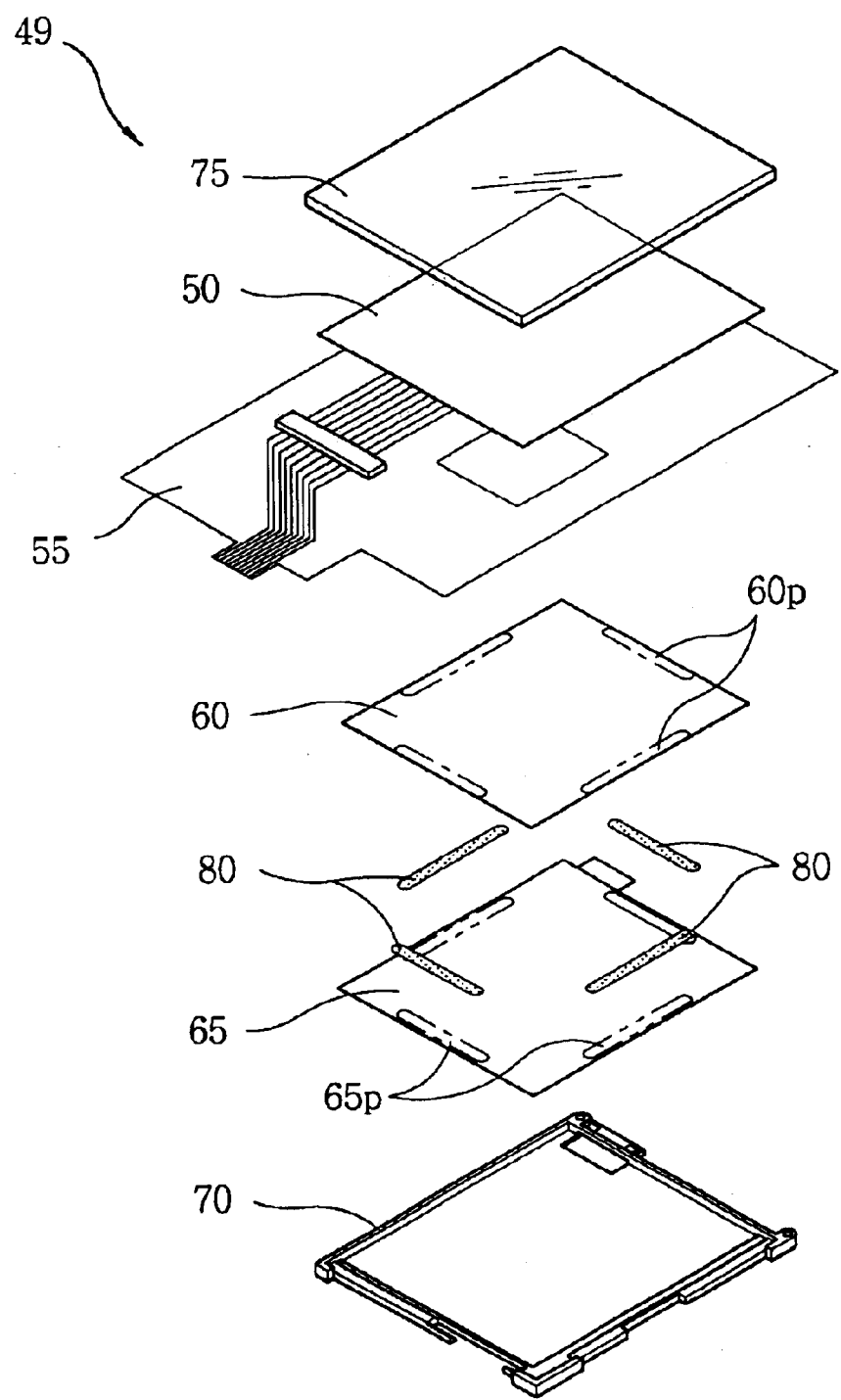
FIG. 7 is an exploded perspective view showing a liquid crystal display apparatus in accordance with the embodiment of the present invention.
Figure 8:
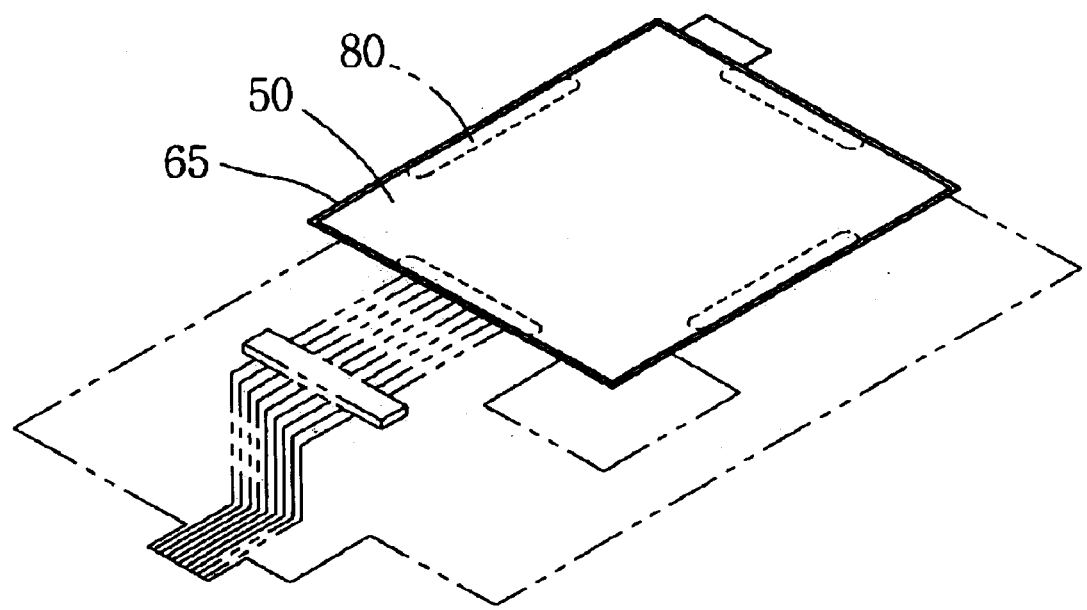
FIG. 8 is a perspective view showing the condition that a liquid crystal panel and back light sheet in accordance with an embodiment of the present invention are adhered.

FIGS. 7 and 8 are views showing the liquid crystal display apparatus positioned in the mobile terminal in accordance of an embodiment of the present invention. FIG. 7 is an exploded perspective view showing a liquid crystal display apparatus in accordance with an embodiment of the present invention and FIG. 8 is a perspective view showing the condition that a liquid crystal panel and back light sheet in accordance with an embodiment of the present invention are adhered.

The liquid crystal display apparatus in accordance of an embodiment of the present invention is installed in a frame 70 fixed in the folder of the mobile terminal shown in FIG. 6 and can display letter or image information through a viewing window of the folder 41.

The liquid crystal display apparatus 49 has a liquid crystal panel 50 having a square flat shape and a FPC 55 is connected to the liquid crystal panel 50. A reflection board 60 for reflecting light incident from the side of the liquid crystal panel 50 in the front direction is adhered to the rear surface of the panel as a single body.

On the rear surface of the panel 50 where the reflection board 60 is attached, a back light sheet 65 formed in a square flat shape, for irradiating light to the liquid crystal panel 50 is positioned and the reflection board 60 and the back light sheet 65 forming the rear surface of the liquid crystal panel 50 are mutually adhered by the plurality of double-faced adhesive tapes 80.

Namely, the double-faced adhesive tape 80 is adhered to the four edges 60P and 65P except the four corners in the reflection board 60 and the back light sheet 65 and accordingly, the liquid crystal panel 50 and the back light sheet 65 can be mutually adhered to each other.

Here, it is desirable that the double-faced adhesive tapes 80 are installed at four all edges of the liquid crystal panel 50 and the back light sheet 65 and according to the design condition the tapes can be installed only at two parts opposing to each other.

The liquid crystal panel 50 and the back light sheet 65 adhered to the double-faced adhesive tape 80 are adhered to each other as a single body and form a liquid crystal panel assembly and the liquid crystal panel assembly is inserted-assembled in the frame 70.

On the other hand, reference numeral 75 in FIG. 7 is a polarizing plate positioned at the front side of the above liquid crystal panel 50 for penetrating light penetrated through the liquid crystal panel 11.

Figure 9:
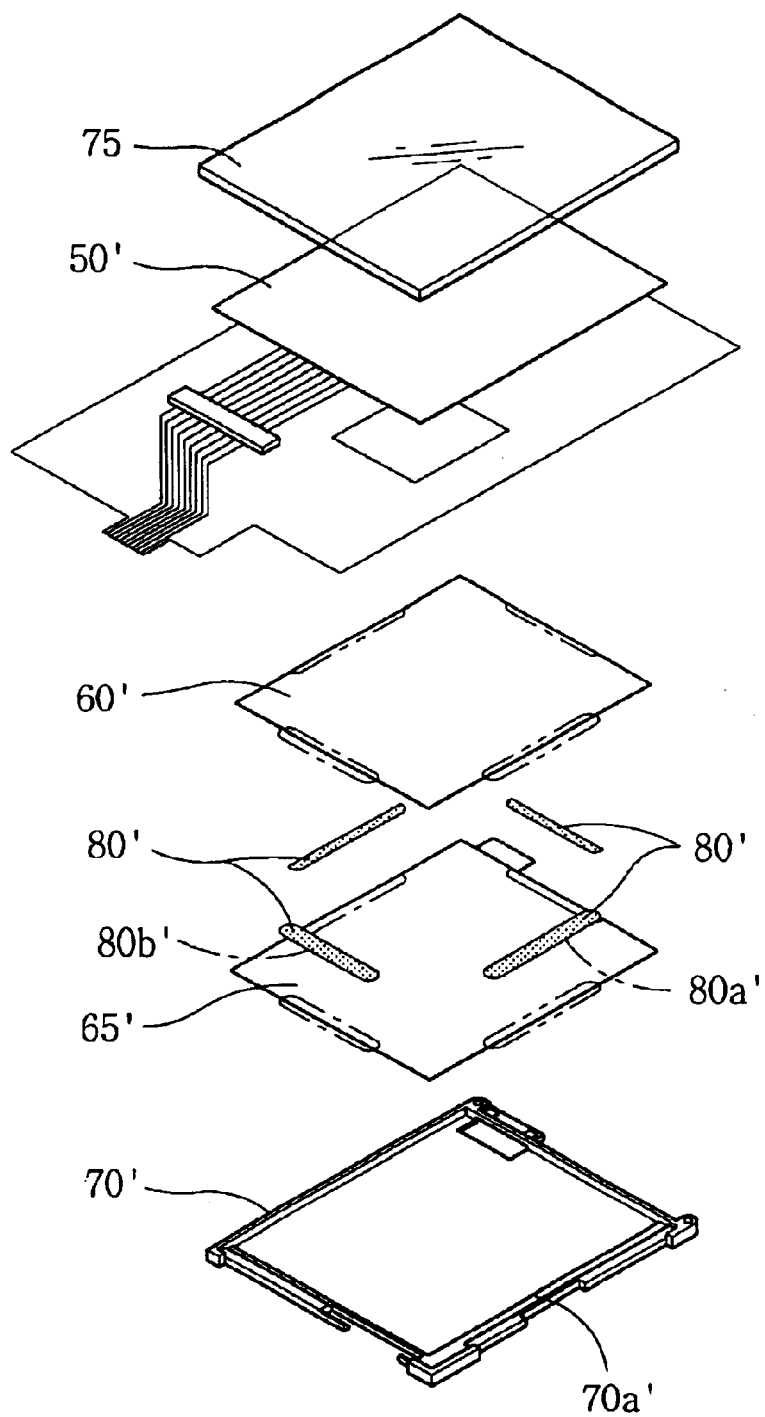
FIG. 9 is an exploded perspective view showing the liquid crystal display apparatus in accordance with other embodiment of the present invention.
Figure 10:
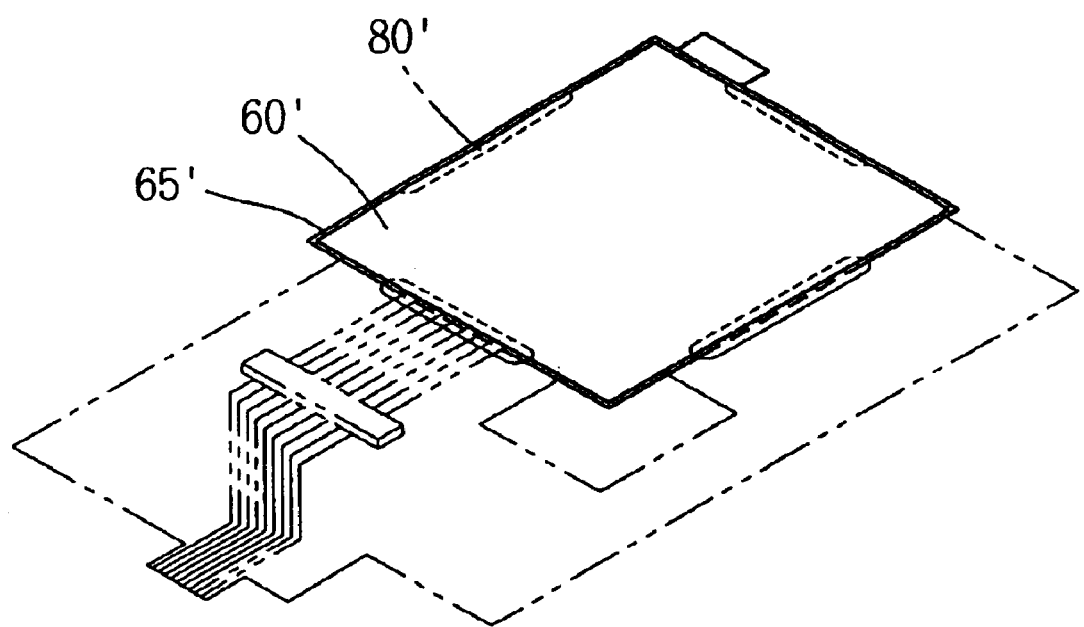
FIG. 10 is a perspective view showing the condition that the liquid crystal panel and back light sheet in accordance with the other embodiment of the present invention are adhered.

FIGS. 9 and 10 are views showing the liquid crystal display apparatus in accordance with other embodiment of the present invention. FIG. 9 is an exploded perspective view showing the liquid crystal display apparatus and FIG. 10 is a perspective view showing the condition that the liquid crystal panel and back light sheet are adhered.

The liquid crystal display apparatus in accordance with other embodiment of the present invention has a reflection board 55' adhered to the rear surface of the liquid crystal panel 50' as a single body and on the rear surface of the liquid crystal panel 50', a back light sheet 65' is attached by a plurality of double-faced adhesive tapes 80' as in the above described embodiment.

Particularly, the double-faced adhesive tapes 80' are adhered to only four corner parts except four edges of the reflection board 60' and the liquid crystal panel 50' and two of the four double-faced adhesive tapes are adhered to the inner surface 70A' of the frame 70' having parts 80A' and 80B' protruded further outwardly than the periphery of the liquid crystal panel 50' and back light sheet 65.

Finally, the liquid crystal panel 50' and back light sheet 65' are adhered to each other as a single body by the double-faced adhesive tapes 80' and the liquid crystal panel assembly is inserted in the frame 70' and adhered and supported by the frame 70' by the two double-faced adhesive tapes 80'.

The operation of the liquid crystal display apparatus having the above composition in accordance with the present invention will be described as follows.

Figure 5A:
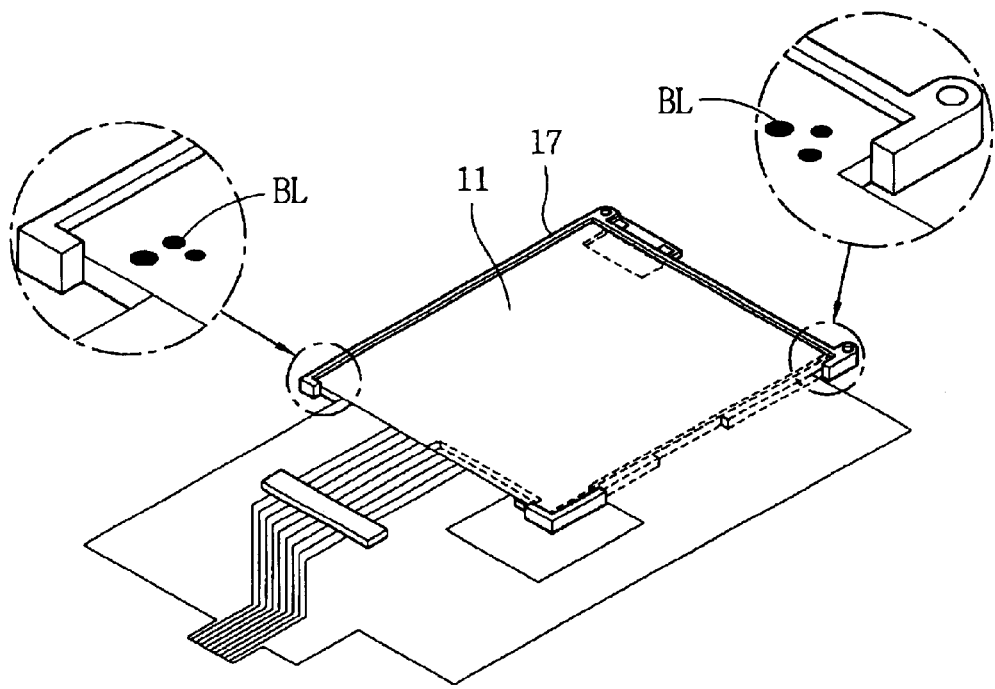
FIGS. 5A and 5B are a view showing a bleeding of the conventional liquid crystal panel by the falling impact.
Figure 5B:
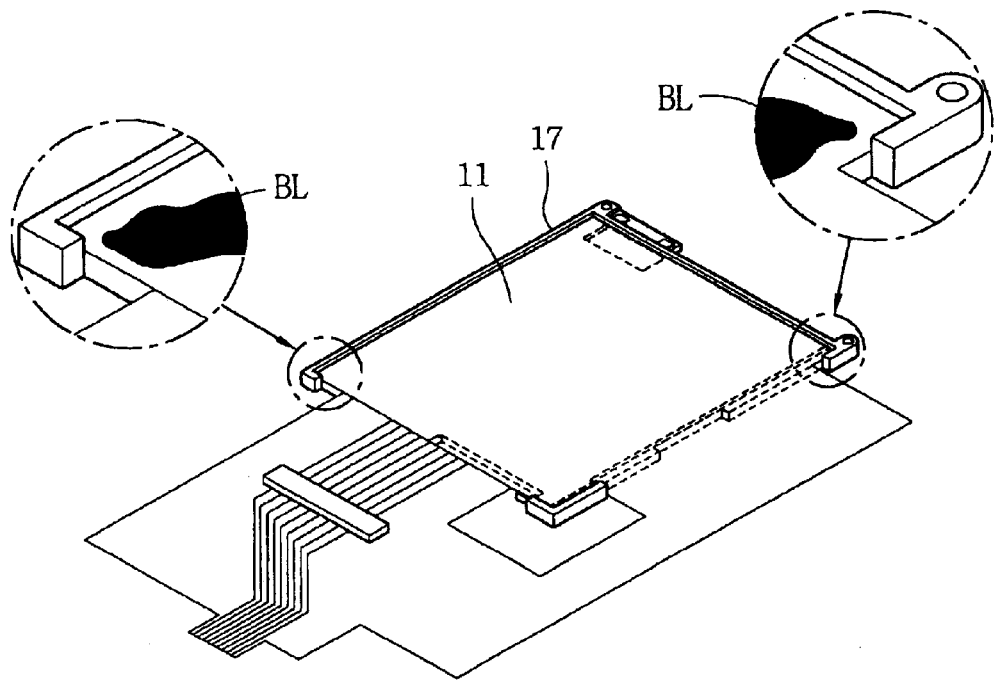

When heat impact, wrenching load and falling impact are applied to the folder-type mobile terminals having the liquid crystal display apparatuses in accordance with the present and conventional arts, as shown in FIG. 5, inferiority, that is, the bleeding phenomenon was occurred.

| kind of experiment | conventional art | present art (an embodiment) | present art (other embodiment) |
|---|---|---|---|
| heat impact | 61 | 0 | 0 |
| wrenching load | 60 | 0 | 0 |
| falling impact | 62 | 0 | 0 |

Numeral values according to each experiment in the above table are results that 100 folder-type mobile terminals are tested and among factors according to each experiment of each terminal, the heat impact experiment was repeated 6 times varying temperature from −30 to 80° C., the wrenching experiment was conducted by repeating a wrenching load of 3.7 kg 30,000 times and the falling impact experiment was conducted by failings of 6 surfaces of a terminal respectively one time under the condition that the folder was closed and by fallings of 6 surfaces of a terminal respectively one time under the condition that the folder was opened.

As shown in the above table, the liquid crystal display apparatus in accordance with the present invention binds edge parts of the liquid crystal panel 50 and the back light sheet 65 under the condition that they are mutually adhered by attaching the double-faced adhesive tapes 80 only to edge parts except the corner parts of the flat surface of the liquid crystal panel 50 but the corner parts of the liquid crystal panel 50 is not bound to the back light sheet 65 or frame 70.

Figure 1:
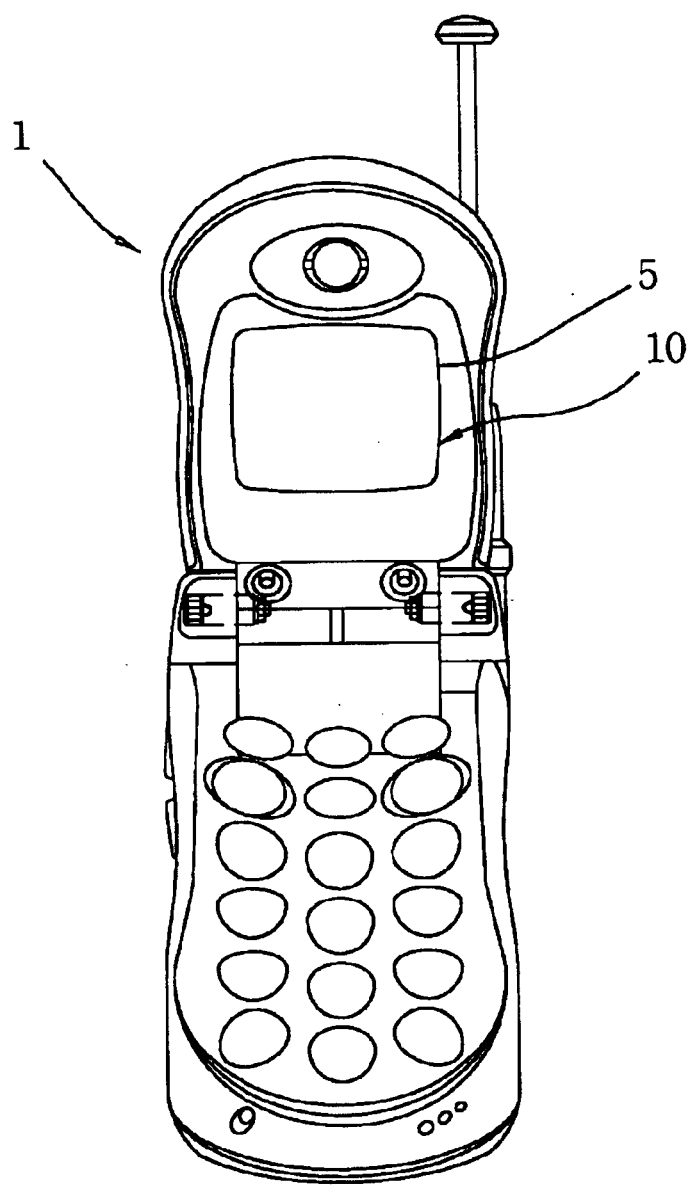
FIG. 1 is a perspective view showing a conventional mobile terminal.
Figure 2:
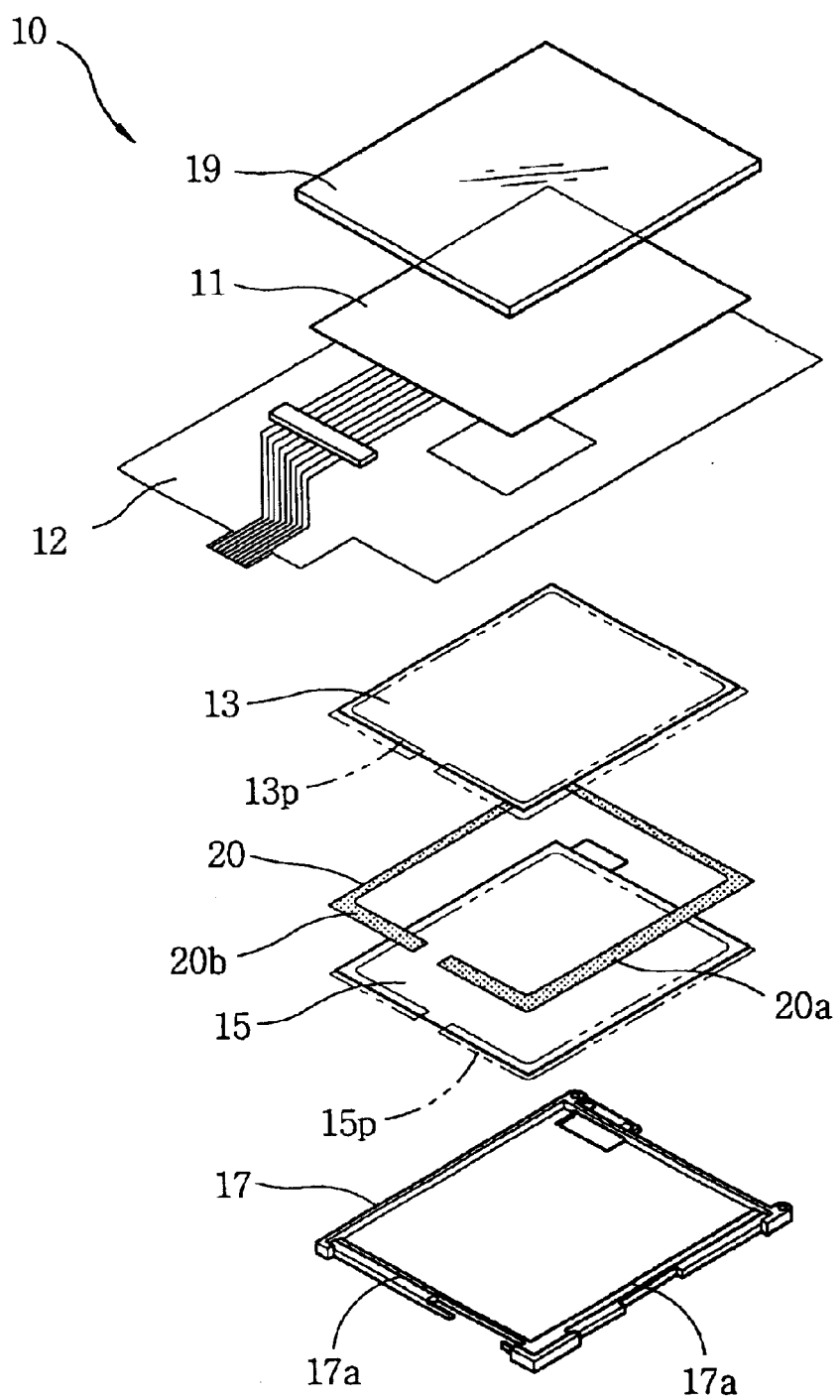
FIG. 2 is an exploded perspective view showing the conventional liquid crystal display apparatus.
Figure 3:
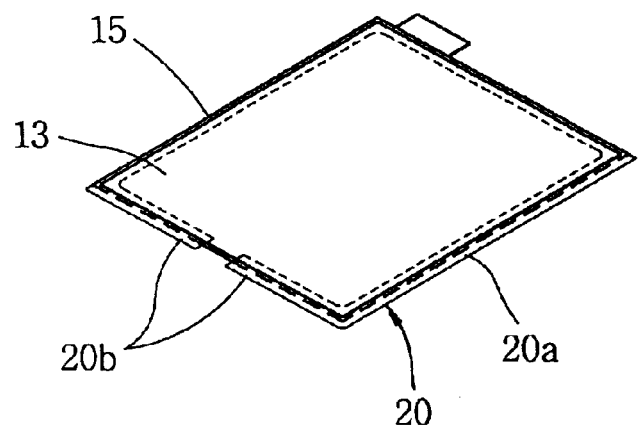
FIG. 3 is a perspective view showing the condition that a conventional liquid crystal panel and back light sheet are adhered.
Figure 4:
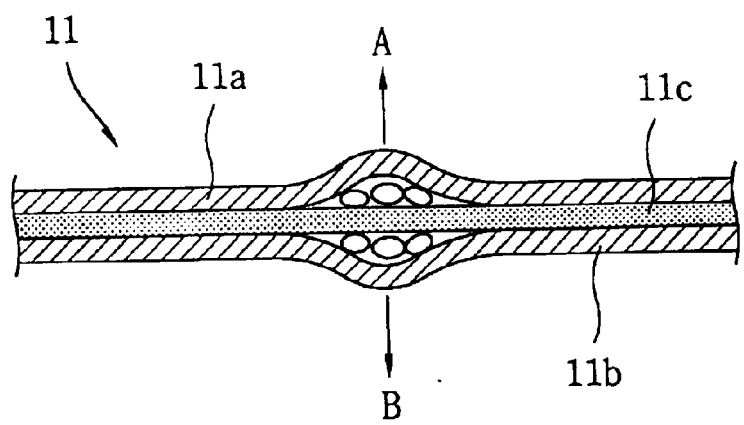
FIG. 4 is a view showing the conventional liquid crystal panel changed by a falling impact.

Therefore, since when heat impact, wrenching load and falling impact are applied to the mobile terminal having the liquid crystal display apparatus in accordance with the present invention, the corner parts where the bleeding phenomenon is easily occurred in the liquid crystal panel 50 is not bound, the phenomenon that the upper and lower substrates are cracked apart is minimized as shown in FIG. 4 and the bleeding phenomenon in the spot shape can be prevented, thus to reduce inferiority of the liquid crystal display apparatus.

In the liquid crystal display apparatus in accordance with the present invention with the above composition and operation, the double-faced adhesive tape is installed only edge parts except the corner parts of the liquid crystal panel and the liquid crystal panel and the back light sheet can be attached to each other. Accordingly, spot generation is minimized even if impacts by varying temperature and falling or a certain wrenching load is applied and durability of the liquid crystal panel can be increased.

Also, in the liquid crystal display apparatus in accordance with the present invention with the above composition and operation, since the liquid crystal display apparatus is installed, damage of the liquid crystal panel by external impacts can be minimized and the efficiency of the display unit conducted by the liquid crystal panel is not decreased, thus to improve reliability of the terminal.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A liquid crystal display assembly comprising:
   a liquid crystal display panel having a polygonal shape and comprising upper and lower surfaces;
   an optical member affixed to the lower surface of the display panel, wherein the optical member has a periphery;
   a flexible illuminating member positioned under the optical member, wherein the illuminating member has a periphery corresponding to and approximately aligned with the periphery of the optical member; and
   at least one adhesion member installed between the optical and illuminating members and extending along at least one edge of the peripheries of the optical and illuminating members, wherein the at least one adhesion member does not substantially extend to intersections of edges of the periphery of each of the optical and illuminating members.

2. The assembly of claim 1, wherein the at least one adhesion member comprises double-faced adhesive tape.

3. The assembly of claim 1, wherein the liquid crystal display panel is square.

4. The assembly of claim 1, wherein the at least one adhesion member is installed at two opposing edges.

5. The assembly of claim 1, wherein the at least one adhesion member is installed at all opposing edges.

6. The assembly of claim 1, wherein the optical member is a reflection board and the illuminating member is a back light sheet.

7. The assembly of claim 1, further comprising a polarizing plate fastened to the upper surface of the liquid crystal display panel.

8. The assembly of claim 1, further comprising a frame, wherein the at least one adhesion member extends beyond the peripheries of the optical and illuminating members, thereby fastening the optical and illuminating members to the frame.

9. A mobile communication terminal comprising:
a transmission and reception device positioned at one side of a case;
a plurality of input adjusting devices arranged on a surface of the case;
a control unit for outputting a driving signal according to an input signal received from the manipulation of the plurality of input adjusting devices;
a liquid crystal display driving unit for receiving and converting the input and driving signals to letter and image information;
a liquid crystal display installed on a surface of the case for displaying the letter or image information provided by the liquid crystal display driving unit, wherein the liquid crystal display comprises:
a liquid crystal display panel having a polygonal shape and comprising upper and lower surfaces;
an optical member affixed to the lower surface of the display panel, wherein the optical member has a periphery;
a flexible illuminating member positioned under the optical member, wherein the illuminating member has a periphery corresponding to and approximately aligned with the periphery of the optical member; and
at least one adhesion member installed between the optical and illuminating members and extending along at least one edge of the peripheries of the optical and illuminating members, wherein the at least one adhesion member does not substantially extend to intersections of edges of the periphery of each of the optical and illuminating members.

10. The terminal of claim 9, wherein the liquid crystal display has a square shape and the at least one adhesion member is installed at two opposing.

11. The terminal of claim 9, wherein the liquid crystal display has a square shape and the at least one adhesion member is installed at four opposing edges.

12. The terminal of claim 9, wherein the liquid crystal display further comprises a frame fastened to the case; and
wherein the at least one adhesion member extends beyond the peripheries of the optical and illuminating members, thereby fastening the optical and illuminating members to the frame.

13. The terminal of claim 9, wherein the at least one adhesion member comprises double-faced adhesive tape.

14. The terminal of claim 9, further comprising a polarizing plate fastened to the upper surface of the liquid crystal display panel.

15. The terminal of claim 9, wherein the optical member is a reflection board.

16. The terminal of claim 9, wherein the illuminating member is a back light sheet.

17. A liquid crystal display assembly comprising:
a liquid crystal display panel having a polygonal shape and comprising upper and lower surfaces;
a polarizing plate fastened to the upper surface of the liquid crystal display panel;
a reflection board affixed to the lower surface of the display panel, wherein the reflection board has a periphery;
a flexible back light sheet positioned under the reflection board, wherein the back light sheet has a periphery corresponding to and approximately aligned with the periphery of the reflection board; and
at least one adhesion member installed between the reflection board and the back light sheet and extending along at least one edge of the peripheries of the reflection board and the back light sheet, wherein the at least one adhesion member does not extend to intersections of edges of the periphery of each of the reflection board and the back light sheet.

18. A liquid crystal display apparatus comprising:
a liquid crystal panel having front and rear surfaces;
a flexible backlight sheet for illuminating the liquid crystal panel, positioned facing the rear surface of the liquid crystal panel, the backlight sheet having a first plurality of corners;
a reflection board positioned between the backlight sheet and the liquid crystal panel for reflecting light incident from the liquid crystal panel, the reflection board having a second plurality of corners oppositely facing the first plurality of corners respectively; and
connectors interposed along oppositely facing circumferential periphery of said backlight sheet and reflection board, wherein said corresponding first and second plurality of corners are not connected by way of the connectors.

19. The apparatus of claim 18, wherein the connectors comprise adhesive material.

20. The apparatus of claim 18, wherein the connectors are double-sided adhesive tapes.

* * * * *